United States Patent
Slattery

(10) Patent No.: US 8,127,282 B2
(45) Date of Patent: Feb. 28, 2012

(54) RECOMPILATION OF A CLASS WITH A JAVA STATIC VARIABLE

(75) Inventor: Edward John Slattery, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 11/934,201

(22) Filed: Nov. 2, 2007

(65) Prior Publication Data

US 2009/0119651 A1    May 7, 2009

(51) Int. Cl.
 *G06F 9/45* (2006.01)
(52) U.S. Cl. .................................................... 717/145
(58) Field of Classification Search ................... 717/145
See application file for complete search history.

(56) References Cited

U.S. PATENT DOCUMENTS

| | | | | |
|---|---|---|---|---|
| 5,978,585 A * | 11/1999 | Crelier | ............................ | 717/145 |
| 2005/0097399 A1* | 5/2005 | Bliss et al. | ........................ | 714/38 |
| 2005/0097534 A1* | 5/2005 | Clement et al. | ................ | 717/148 |
| 2006/0005171 A1* | 1/2006 | Ellison | ............................ | 717/131 |
| 2008/0028373 A1* | 1/2008 | Yang et al. | ..................... | 717/140 |

\* cited by examiner

*Primary Examiner* — Philip Wang
(74) *Attorney, Agent, or Firm* — Schmeiser, Olsen & Watts; Jeanine Ray

(57) ABSTRACT

A system and associated method for directing to recompile a class with a static variable of the class in a Java platform are disclosed. The class is defined with at least two implementations that are selectively compiled and executed a value of the static variable. The value of the static variable of the class is modified to a new value depending on characteristics of a runtime environment in which the method is executed. The class is recompiled and the new value is set for the static variable of the class. A debugger performs a hot code replacement of the class with the recompiled class.

4 Claims, 4 Drawing Sheets

```
1: class Foo {
2: @compiler
3: private static int CompVar = 1;
4:
5: ###if (CompVar == 1)
6: private int SomeFunction(int i) {
7:     if (condition_1) {
8:         Foo.CompVar = 2;
9:     }
10:    function_body;
11:    return 3;
12: }
13: ###else
14: private int SomeFunction(int i) {
15:    if (!condition_1) {
16:        Foo.CompVar = 1;
17:    }
18:    return values.interator().get(i)
19: }
20: ###endif
21: }
```

FIG. 3

# RECOMPILATION OF A CLASS WITH A JAVA STATIC VARIABLE

FIELD OF THE INVENTION

The present invention discloses a system and associated method for efficiently developing and executing a Java code in a Java debugging environment.

BACKGROUND OF THE INVENTION

In conventional Java programming system, a programmer should specify a code and data types at compile time. Once the code is compiled, the code cannot be adjusted to a different runtime environment. When a code requires a new object, the code should be rewritten to support a new class for the new object, recompiled and executed with the new class linked. It is time consuming and inefficient to debug a code in conventional Java programming system.

Thus, there is a need for a system and associated method that overcomes at least one of the preceding disadvantages of current methods and systems for recompiling and debugging Java programs.

SUMMARY OF THE INVENTION

The present invention provides a method for directing to recompile a compiled class with a static variable of a class, the method comprising:

executing a first virtual machine comprising the method and the compiled class, wherein the class defines an object comprising the static variable and at least two implementations that are selectively compiled pursuant to a value of the static variable, wherein the compiled class is an executable code of the class that is derived from a first implementation of said at least two implementation, wherein the first implementation was selected when the static variable is a default value;

determining, while said executing the first virtual machine, that the static variable in the compiled class was modified to a new value;

commanding a compiler to generate a recompiled class responsive to said determining that the static variable was modified to a new value, wherein the recompiled class is another executable code of the class that is derived from a second implementation of said at least two implementation, wherein the second implementation was selected when the static variable is not the default value;

acquiring the recompiled class from the compiler in response to said commanding the compiler;

setting the static value in the recompiled class to the new value; and transitioning from the first virtual machine to a second virtual machine comprising the method and the recompiled class.

The present invention provides a method for directing to recompile a compiled class with a static variable of a class, wherein the method is performed by a bytecode running in a Java platform comprising a compiler and a debugger, the method comprising:

executing a first Java virtual machine, wherein the class defines an object comprising the static variable, a first implementation of the class, and a second implementations of the class, wherein the static variable is a default value, wherein the first Java virtual machine comprises the bytecode and a compiled class, and wherein the compiled class is an executable of the first implementation of the class when the static variable is the default value;

determining, while executing the first Java virtual machine, that the static variable of the compiled class was modified to a new value in the first Java virtual machine;

commanding, while executing the first Java virtual machine, the compiler to generate a recompiled class for a second Java virtual machine responsive to said determining that the static variable of the compiled class was modified to the new value, wherein the recompiled class is an executable of the second implementation of the class when the static variable is not the default value;

acquiring, while executing the first Java virtual machine, the recompiled class generated by the compiler in response to said commanding the compiler;

setting, while executing the first Java virtual machine, the static variable of the recompiled class in the second Java virtual machine to the new value subsequent to said acquiring the recompiled class; and transitioning from the first Java virtual machine to the second Java virtual machine by commanding the debugger to perform an on-the-fly replacement of the compiled class with the recompiled class subsequent to said setting, wherein the static variable of the class is modified to the new value depending on characteristics of a runtime environment, said characteristics comprising a number of processes in the first Java virtual machine, required response time, available memory space in the first Java virtual machine, and characteristics of data elements in the class.

The present invention provides a method and system that overcomes at least one of the current disadvantages of conventional method and system for recompiling and debugging Java programs.

BRIEF DESCRIPTION OF THE DRAWINGS

FIG. 3 is an example code of a method for directing recompilation of a class with a Java static variable, in accordance with the embodiments of the present invention.

DETAILED DESCRIPTION OF THE INVENTION

Figure 1:
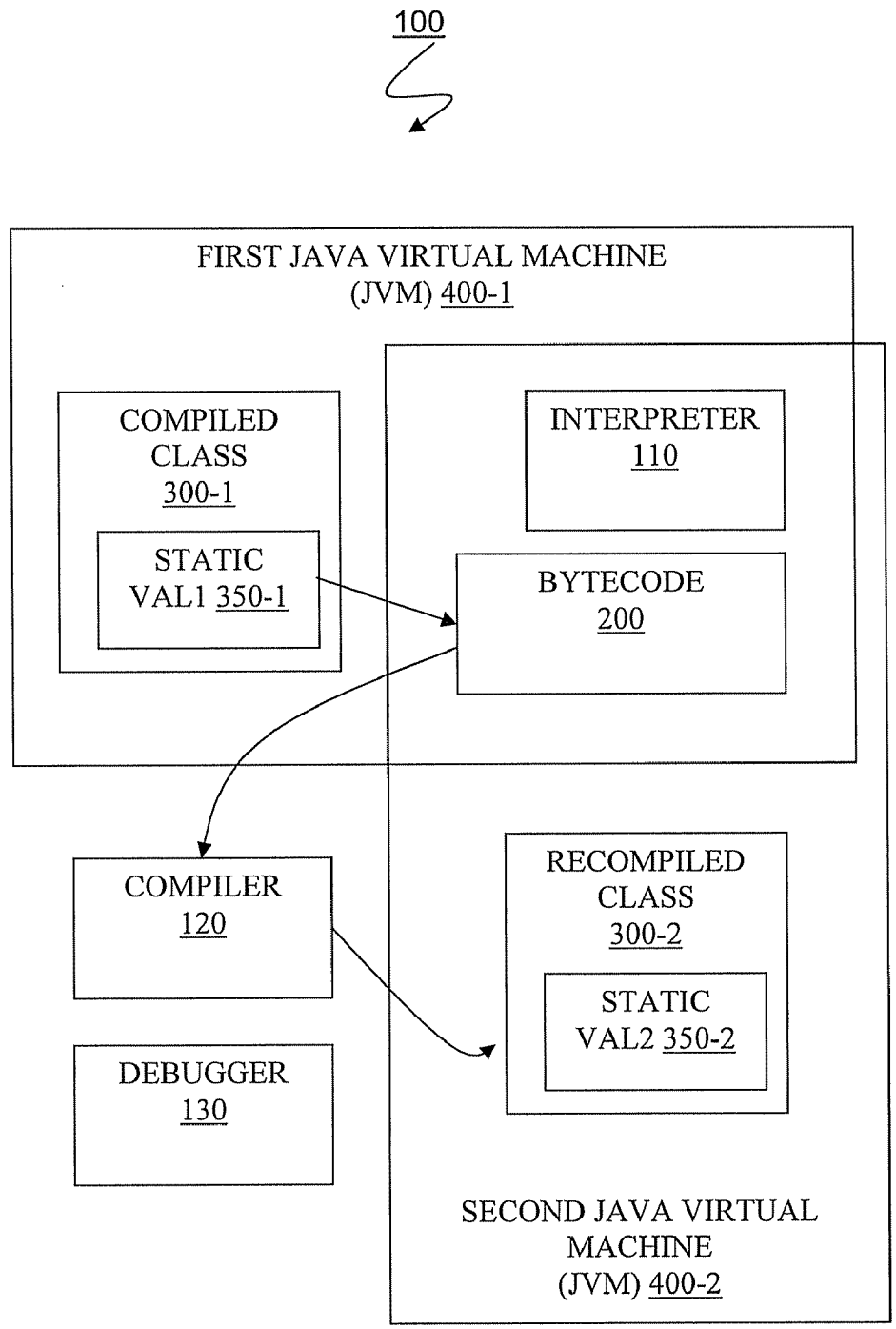
FIG. 1 illustrates a Java platform for directing recompilation of a class with a Java static variable, in accordance with embodiments of the present invention.

FIG. 1 illustrates a Java platform 100 for directing recompilation of a class with a Java static variable, in accordance with embodiments of the present invention.

The Java platform 100 is a runtime environment to execute and develop Java application programs. The Java platform 100 comprises an interpreter 110, a compiler 120, a debugger 130, a first Java virtual machine 400-1, and a second Java virtual machine 400-2. The first Java virtual machine 400-1 comprises a bytecode 200, a compiled class 300-1, and the interpreter 110. The second Java virtual machine 400-2 comprises the bytecode 200, a recompiled class 300-2, and the interpreter 110. The interpreter 110 decodes and executes the bytecode 200 on either of Java virtual machines. The Java platform 100 runs on a computer system 90 of FIG. 4, infra. The compiler 120 compiles a source code written in Java programming language into an object code. The first Java virtual machine 400-1 is a software execution engine driven by the interpreter 110 that executes the bytecode 200 linked and loaded with the compiled class 300-1. The second Java virtual machine 400-2 is a software execution engine driven by the interpreter 110 that executes the bytecode 200 linked and loaded with the recompiled class 300-2. The bytecode 200 is a code that performs the method of the present invention. The bytecode 200 is generated by the compiler 130 from a source code written in Java programming language. The debugger 130 is a software program used to test and correct errors in the bytecode 200 while developing a Java application program with multiple Java virtual machines.

A class is a Java data type that implements a particular object. The class comprises static variables, instances, methods, and interfaces, etc. The compiled class 300-1 and the recompiled class 300-2 can be dynamically invoked by Java applications at runtime. See FIG. 3, infra, for an example of a class.

A static variable is a data item associated with a class. The term "static" is a Java keyword indicating that a variable is associated with a class definition as a whole as opposed to being associated with any particular instance of the class. In the present invention, the static variable in the class enables the class to select which method definition and data types the class will use at runtime. Because the method of the present invention recompiles a class, there are two executable classes, the compiled class 300-1 and the recompiled class 300-2, in the Java platform 100. Consequently, there are two values for each static variable of two compilations of the class. A first static value 350-1 is a value for the compiled class 300-1. A second static value 350-2 is a value for the recompiled class 300-2.

The debugger 130 enables a "hot code replacement" of classes in Java virtual machines. The hot code replacement (HCR) is a debugging technique used when the debugger 130 transmits a new class over a debugging channel from one Java virtual machine to another Java virtual machine. With the hot code replacement, a programmer can replace a Java code in a receiving Java virtual machine while it is running without restarting the receiving Java virtual machine.

Figure 2:
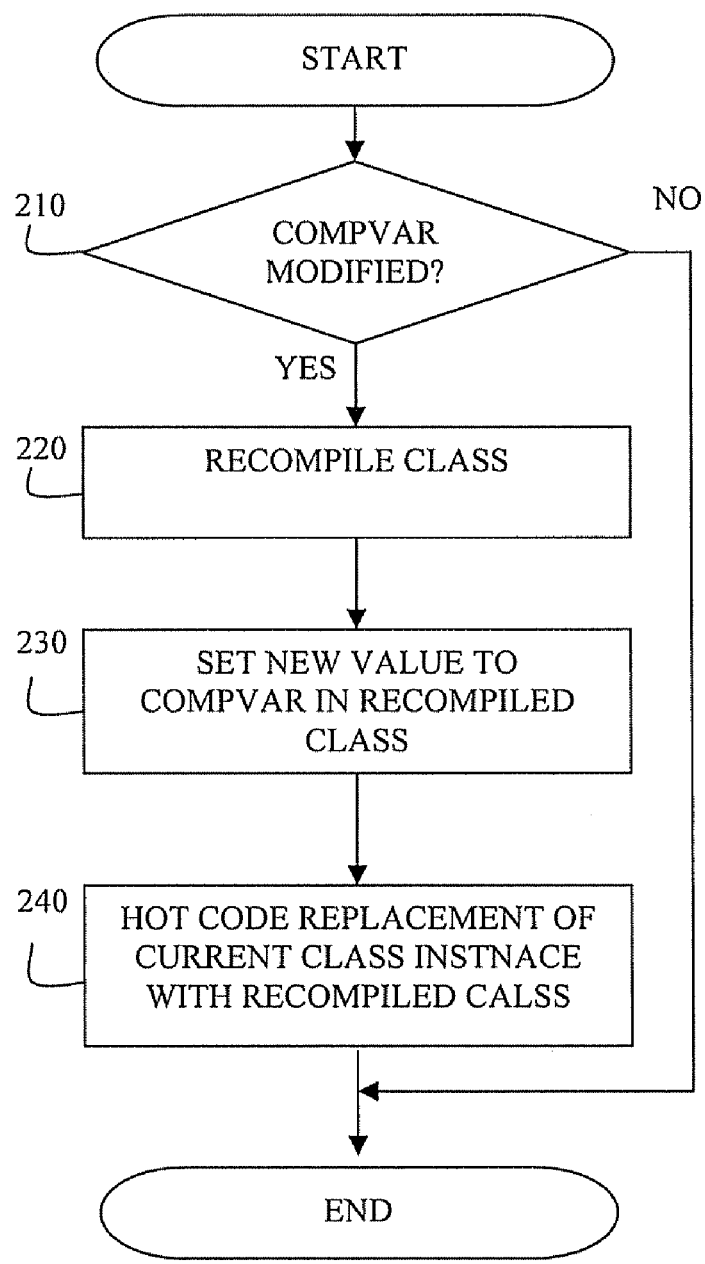
FIG. 2 is a flowchart depicting a method for directing recompilation of a class with a Java static variable, in accordance with the embodiments of the present invention.

FIG. 2 is a flowchart depicting a method for directing recompilation of a class with a Java static variable, in accordance with the embodiments of the present invention.

The compiler of FIG. 1, supra, recognizes a directive for conditional compilation and compiles a class pursuant to a value of a static variable of the class. The static variable is designated for conditional compilation of the class. In one embodiment of the present invention, the directive is "###," and the static variable is COMPVAR. The static variable can also be altered to a new value at runtime pursuant to a runtime environment in which the program runs. In one embodiment of the present invention, a default value is 1. The debugger of FIG. 1, supra, performs hot code replacement of a default class with a recompiled class.

In step 210, the method of the present invention determines whether a value of the static variable has been modified. The static variable had been initiated with a default value in previous compilation. If the method of the present invention determines that a value of the static variable has not been modified, the method of the present invention terminates. If the method of the present invention determines that a value of the static variable has been modified, the interpreter proceeds with step 220.

A runtime environment in which the Java platform runs has plurality of characteristics. The value of the static variable COMPVAR is modified to a new value upon detecting a triggering event as to characteristics of the runtime environment. Characteristics of the runtime environment may include, inter alia, a number of processes in a virtual machine, required response time, available memory space in a virtual machine, and characteristics of data elements in a class.

In one embodiment of the present invention, the class is defined with two variations for a class method, wherein a first method definition is a more complicated calculation to achieve accuracy when a number of processes in the virtual machine is relatively low, and wherein a second method definition is a shorter calculation producing a proximate result calculated by the first method definition to achieve prompt response when the virtual machine is overly loaded with processes. Accordingly, depending on changes in a number of processes in a virtual machine and/or required response time to process classes, the method of the present invention modifies a value of the static variable to replace one class method definition to another class method definition on the run without stopping execution of a previous virtual machine.

In another embodiment of the present invention, a first method definition of a class employs an array data type based on a predefined memory usage requirement, and a second method definition of the class employs a linked list data type to keep the amount of free memory space as large as possible. This embodiment of the present invention modifies a value of the static variable to replace the first method definition with the second method definition upon detecting a decrease in available memory space below a predefined threshold when there are too many allocated but unused array elements. Because a linked list data type allocates minimal memory space at compile time, this embodiment of the present invention keeps available memory space in the virtual machine as large as possible. This embodiment utilizes on the fly a class method definition which is appropriate for runtime characteristics of memory usage.

In step 220, the method of the present invention commands the compiler to recompile the class. As a result, a recompiled class is created and made available to the method of the present invention.

In step 230, the method of the present invention set the static variable with a modified value that was determined in step 210.

In step 240, the method of the present invention commands the debugger to perform hot code replacement of a previous compilation of the class with the recompiled class from step 220.

FIG. 3 is an example code of a method for directing recompilation of a class with a Java static variable, in accordance with the embodiments of the present invention.

Initially the class Foo is compiled with the static value '1' in the static variable CompVar, and the class Foo has a method SomeFunction( ) defined in lines 6 to 12.

During runtime, each invocation of the method SomeFunction( ) of the class Foo performs the method of the present invention as described in FIG. 2, supra. If the static variable CompVar has a value other than 1, then the class Foo has a method SomeFunction( ) definition as in lines 14 to 19.

Figure 4:
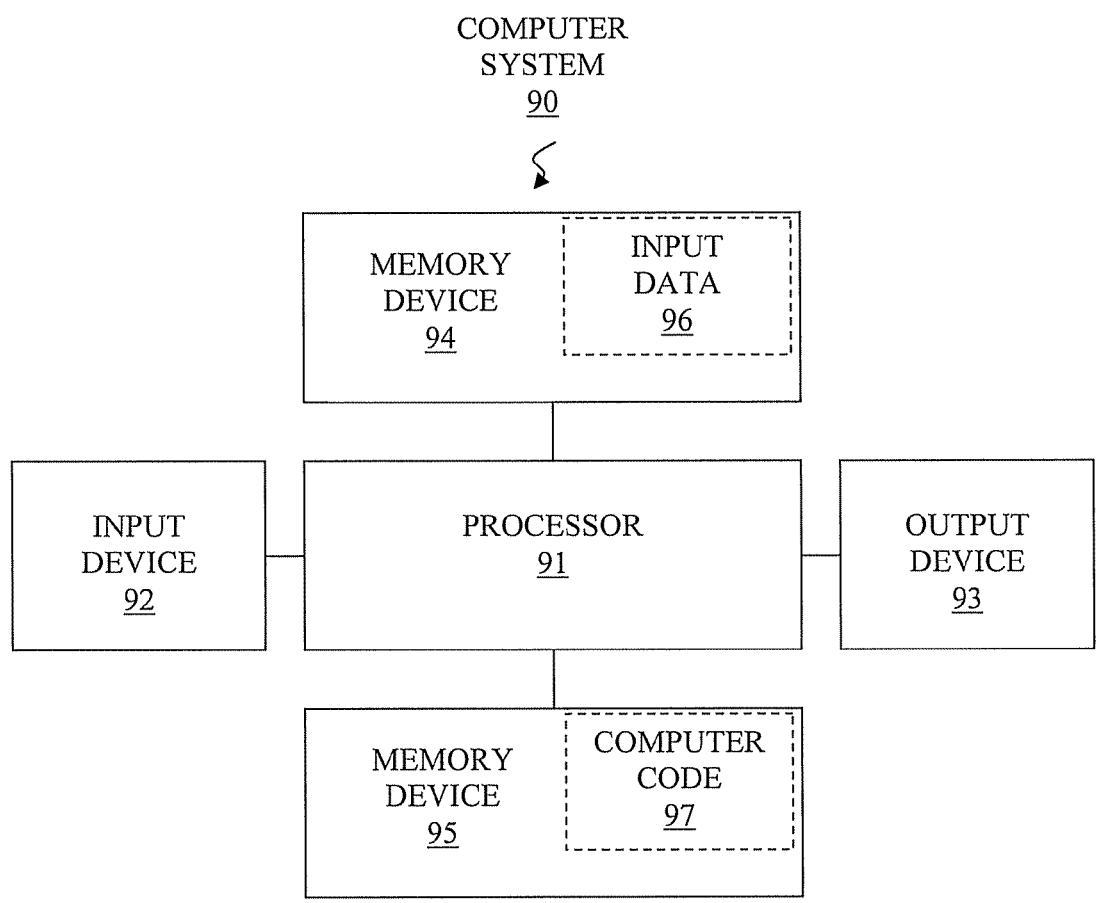
FIG. 4 illustrates a computer system used for directing recompilation of a class with a Java static variable, in accordance with embodiments of the present invention.

FIG. 4 illustrates a computer system 90 used for directing recompilation of a class with a Java static variable, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for directing recompilation of a class with a Java static variable according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for directing recompilation of a class with a Java static variable of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for directing recompilation of a class with a Java static variable.

In another embodiment, the invention provides a business method that performs the process steps of the invention on a subscription, advertising and/or fee basis. That is, a service provider, such as a Solution Integrator, can offer to create, maintain, support, etc. a process for directing recompilation of a class with a Java static variable of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for directing to recompile a compiled class with a static variable of a class, the method comprising:

executing a first virtual machine, by a processor of a computer system, comprising the method and the compiled class, wherein the class defines an object comprising the static variable and at least two implementations that are selectively compiled pursuant to a value of the static variable, wherein the compiled class is an executable code of the class that is derived from a first implementation of said at least two implementation, wherein the first implementation was selected when the static variable is a default value;

determining, while said executing the first virtual machine, that the static variable in the compiled class was modified to a new value;

commanding a compiler to generate a recompiled class responsive to said determining, wherein the recompiled class is another executable code of the class that is derived from a second implementation of said at least two implementation, wherein the second implementation was selected when the static variable is not the default value;

acquiring the recompiled class from the compiler in response to said commanding;

setting the static value in the recompiled class to the new value; and transitioning from the first virtual machine to a second virtual machine comprising the method and the recompiled class.

2. The method of claim 1, wherein the static variable of the class is modified to the new value depending on characteristics of a runtime environment, said characteristics comprising a number of processes in the first virtual machine, required response time, available memory space in the first virtual machine, and characteristics of data elements in the class.

3. A computer program product, comprising a computer usable storage device storing a computer readable program code embodied therein, said computer readable program code containing instructions that when executed by a processor of a computer system implement directing to recompile a compiled class with a static variable of a class, said directing comprising:

executing a first virtual machine comprising the method and the compiled class, wherein the class defines an object comprising the static variable and at least two implementations that are selectively compiled pursuant to a value of the static variable, wherein the compiled class is an executable code of the class that is derived from a first implementation of said at least two implementation, wherein the first implementation was selected when the static variable is a default value;

determining, while said executing the first virtual machine, that the static variable in the compiled class was modified to a new value;

commanding a compiler to generate a recompiled class responsive to said determining, wherein the recompiled class is another executable code of the class that is derived from a second implementation of said at least two implementation, wherein the second implementation was selected when the static variable is not the default value;

acquiring the recompiled class from the compiler in response to said commanding;

setting the static value in the recompiled class to the new value; and transitioning from the first virtual machine to a second virtual machine comprising the method and the recompiled class.

4. A method for directing to recompile a compiled class with a static variable of a class, wherein the method is performed by a bytecode running in a Java platform comprising a compiler and a debugger, the method comprising:

executing a first Java virtual machine, by a processor of a computer system, wherein the class defines an object comprising the static variable, a first implementation of the class, and a second implementations of the class, wherein the static variable is a default value, wherein the first Java virtual machine comprises the bytecode and a compiled class, and wherein the compiled class is an executable of the first implementation of the class when the static variable is the default value;

determining, while executing the first Java virtual machine, that the static variable of the compiled class was modified to a new value in the first Java virtual machine;

commanding, while executing the first Java virtual machine, the compiler to generate a recompiled class for a second Java virtual machine responsive to said determining that the static variable of the compiled class was modified to the new value, wherein the recompiled class is an executable of the second implementation of the class when the static variable is not the default value;

acquiring, while executing the first Java virtual machine, the recompiled class generated by the compiler in response to said commanding the compiler;

setting, while executing the first Java virtual machine, the static variable of the recompiled class in the second Java virtual machine to the new value subsequent to said acquiring the recompiled class; and transitioning from the first Java virtual machine to the second Java virtual machine by commanding the debugger to perform an on-the-fly replacement of the compiled class with the recompiled class subsequent to said setting, wherein the static variable of the class is modified to the new value depending on characteristics of a runtime environment, said characteristics comprising a number of processes in the first Java virtual machine, required response time, available memory space in the first Java virtual machine, and characteristics of data elements in the class.

* * * * *